(12) United States Patent
Williams et al.

(10) Patent No.: US 6,514,016 B1
(45) Date of Patent: Feb. 4, 2003

(54) STUCK TOOL DETECTOR AND RELATED METHOD

(75) Inventors: John A. Williams, Greenwood, IN (US); Will W. Mathews, Greenfield, IN (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 184 days.

(21) Appl. No.: 09/702,159

(22) Filed: Oct. 30, 2000

Related U.S. Application Data (60) Provisional application No. 60/162,566, filed on Oct. 29, 1999.

(51) Int. Cl.[7] .............................................. B23B 47/24
(52) U.S. Cl. ........................ 408/1 R; 340/680; 408/6; 408/16; 409/134; 409/187; 409/194
(58) Field of Search ........................... 408/1 R, 6, 15, 408/5, 9, 11, 13, 14, 8, 16; 340/680; 409/134, 187, 194

(56) References Cited

U.S. PATENT DOCUMENTS

| | | | |
|---|---|---|---|
| 2,920,508 A | * 1/1960 | Wennerberg | 408/6 |
| 3,575,518 A | * 4/1971 | Waldmann | 408/6 |
| 3,584,522 A | 6/1971 | Smafield | |
| 3,609,053 A | 9/1971 | Klem | |
| 3,647,998 A | 3/1972 | Rohraff, Sr. | |
| 3,669,557 A | * 6/1972 | Mitchell | 408/16 |
| 3,728,919 A | 4/1973 | Scott | |
| 3,870,430 A | * 3/1975 | Guenot | 408/6 |
| 4,056,329 A | * 11/1977 | Perry | 408/6 |
| 4,090,802 A | 5/1978 | Bilz | |
| 4,180,356 A | 12/1979 | Hoch | |
| 4,207,567 A | 6/1980 | Juengel et al. | |
| 4,249,243 A | 2/1981 | Yoshida et al. | |
| 4,420,685 A | 12/1983 | Ohtani et al. | |
| 4,498,326 A | 2/1985 | Brandt et al. | |
| 4,502,823 A | 3/1985 | Wronski et al. | |
| 4,636,780 A | 1/1987 | Thomas et al. | |
| 4,642,618 A | 2/1987 | Johnson et al. | |
| 4,667,113 A | 5/1987 | Nakajima et al. | |
| 4,707,687 A | 11/1987 | Thomas et al. | |
| 4,776,205 A | 10/1988 | Brooks et al. | |
| 4,786,860 A | 11/1988 | Zimmerman | |
| 5,293,048 A | 3/1994 | Skunes et al. | |
| 5,691,647 A | * 11/1997 | Bentzian et al. | 340/680 |

FOREIGN PATENT DOCUMENTS

DE 19828897 A * 12/1999 ........... B23B/47/00

* cited by examiner

*Primary Examiner*—Steven C. Bishop
(74) *Attorney, Agent, or Firm*—Dennis Kelly Sullivan; Jeffrey P. Calfa; Neil T. Powell (57) ABSTRACT

There is provided an apparatus and method for detecting stuck tools in automated machining operations. When a machining operation on a workpiece is finished, the tools are retracted from the workpiece. Prior to moving the workpiece to another machining operation, a stuck tool detector is moved along a plane of separation between the machine head and the workpiece. If a stuck tool is present, the detector senses the stuck tool and sends an alarm signal of the stuck tool condition so that the operator or controlling microprocessor based system is alerted to the stuck tool. Appropriate actions or repairs can then be carried out.

33 Claims, 8 Drawing Sheets

STUCK TOOL DETECTOR AND RELATED METHOD

This patent application claims the benefit of Provisional U.S. Patent application Ser. No. 60/162,566 filed on Oct. 29, 1999.

FIELD OF THE INVENTION

This invention relates generally to systems for detecting failures in machining processes. More particularly, this invention relates to equipment and methods for detecting stuck tools in automated machining operations.

BACKGROUND OF THE INVENTION

Manufacturers use various machines to drill, bore, tap, and shape workpieces into final products. A particular machine may perform a single machining operation, such as drilling or tapping, or may perform a combination of machining operations. In a typical manual machining operation, an operator may secure a workpiece in a jig, or locating & clamping device, and then position the workpiece adjacent to the head portion of the machine. A tool—e.g., a drill bit—then engages the workpiece piece and performs its particular machining operation—e.g., drilling. When finished, the tool is retracted from the workpiece and returned to its starting position in the head portion of the machine. Prior to moving or repositioning the workpiece, the operator is able to determine whether the tool is stuck in the workpiece.

In an automated machining process, several machining operations are commonly performed in tandem by the same machine or multiple machines. Also, the actual machining of the workpiece may be carried at one or more machining stations that comprise the machining process. Initially an operator, robotic device, or other suitable means secures the workpiece to a travelling pallet (sometimes referred to a jig), or to a locating and clamping device at a machining station.

Typically, when the workpiece is secured to a travelling pallet, or jig, both the traveling pallet and workpiece travel together through the machining process. In another commonly used machining process, the workpiece travels by itself through the machining process. In this case, the workpiece cooperatively encounters stationary locating and clamping devices that will secure the workpiece at each machining station in the machining process. When the particular machining operation is complete, the locating and clamping devices, that secured the workpiece, remain at the machining station while the workpiece advances to the next machining station. Those of skill in the art will recognize other ways to secure the workpiece for machining are also available. For example, a combination of the two methods just described may be used to secure the workpiece.

A microprocessor-based system then moves the secured workpiece through the automated machining process. The secured workpiece is positioned adjacent to the head of a machine. One or more tools extend from the head towards the workpiece in order to perform work on or to machine the workpiece.

When a machining operation is completed, the tools retract from the workpiece and return to their starting position within the head. Depending on the machine used, the tools may be completely or partially within the machine head in their starting positions. The microprocessor-based system then moves the workpiece being worked on to another machining station or repositions it for another machining operation on the same machine or machining station. When the automated machining process is completed, the workpiece is removed from the moving pallet or stationary clamping device.

Stuck tools are a major problem in automated machining processes. A stuck tool is a tool that has become imbedded in the workpiece when the machining operation is completed. In this state, the stuck tools are usually broken-i.e., the tool has separated from the head even though part of it may extend into the head. However, a stuck tool does not have to be broken. The tool may remain attached to the head for many reasons. In this case, the head, tool, and workpiece are connected to each other.

In addition, broken tools are not always stuck in the workpiece. A broken tool may be retracted or pushed into the head. A broken tool may fall out of the head. Also, some tools break into many pieces and fall to the ground.

Typically, a stuck tool extends out of the workpiece and into the head. If the workpiece is then moved, which usually is the next step in an automated machining process, the stuck tool will most likely rip apart the head, the workpiece, and surrounding equipment. The expense of repairing or replacing damaged equipment is significant. The production loss is even more costly in this scenario.

The prior art provides many devices for detecting broken tools. Some are acoustic devices for measuring the change in frequency of the tool or measuring the change in vibrations within the workpiece when the tool breaks. Some detectors are fluid based devices; they leak water or air when the tool breaks. Other detectors are electrical and measure changing electrical parameters. Some detectors use clutches or other mechanical devices to measure the speed and other changes when a tool breaks.

While these prior art devices may detect a broken tool, they are not well suited for detecting a stuck tool. They do not determine whether a tool is imbedded in the workpiece. It is noted that a tool may be broken but not imbedded in the workpiece. While it is good to know a tool is broken, it is very important to know whether the tool is stuck in the workpiece. Moreover, a broken tool detector does not detect when an unbroken tool is stuck in the workpiece. In this case, a broken tool detector would indicate everything is fine, permitting the workpiece to move and thus wreak havoc on the equipment.

Accordingly, there is a need in automated machining processes to be able to detect a stuck tool prior to movement of the workpiece to the next or subsequent machining operation.

SUMMARY OF THE INVENTION

The present invention provides an apparatus and method for detecting stuck tools in automated machining operations. There is provided a stuck tool detector for use in an automated machining process having an automated machining tool with reciprocating tools for work on a workpiece. The stuck tool detector is comprised of at least one stuck tool sensing member that selectively travels in a plane of separation between the workpiece and the automated machine. There is also at least one stuck tool sensor that is cooperatively connected to a corresponding stuck tool sensing member such that the stuck stool sensing member will actuate a corresponding stuck tool sensor when a stuck tool is encountered resulting in an alarm signal.

The stuck stool sensing member travel is controlled by the automated machining tool which uses a microprocessor based controller, and can travel in a vertical, horizontal, radial or angled direction. The stuck tool sensing member can be a trip-wire, a blade, a moveable guide member, an electromagnetic wave, a light beam, or a laser beam. The trip-wire can further be a slat, a wire, or a cord, while the moveable guide member can be made of metal, plastic, composite materials, or an engineered elastomer.

In operation, the machining tool is retracted from the workpiece at the completion of a machining operation. Prior to moving the workpiece to a subsequent machining operation, the stuck tool detector is actuated to determine whether there is a stuck tool between the workpiece and the machine head. If a stuck tool is present, the stuck stool detector will generate an alarm signal that will alert the operator of a stuck tool. Alternatively or additionally, the microprocessor based system may receive and sense the stuck tool sensor alarm signal and take the appropriate action to prevent the automated machining process from proceeding to the next machining operation and thereby damaging the workpiece and machining tool.

In a first embodiment, the stuck tool detector has a detector arm that has a first end and a second distal end. There is also a trip-wire that is attached between the first end and second distal end of the detector arms. The trip-wire is further attached to a stuck tool sensor. The stuck tool detector rotates about a rotating pivot pin to move the trip-wire along a plane of separation between the workpiece and the head.

In a second embodiment, a blade, or moveable guide member, is cooperatively positioned between a first and second guide, or blade guide, for sliding the moveable guide member or blade along a plane of separation between the workpiece and the head. At least one proximity sensor is positioned adjacent to one of the blade guides to determine the position of the blade. Alternatively, a stuck tool sensor may be used to sense when the moveable guide member has stopped moving due to a stuck tool.

In a third embodiment, a detector transport, moves a moveable guide member, or blade, along the plane of separation between the workpiece and the machine head. Stuck tool sensors, such as an up-sensor and a down-sensor, determine the position of the detector transport and thereby the position of the moveable guide member.

There is also provided a method for detecting a stuck tool. First, a machining operation on a workpiece is completed. Next, the machine tool is retracted from the workpiece toward the machine. The workpiece and head are then held in place. The microprocessor based system then operates a stuck tool detector to determine whether there is a stuck tool in the workpiece. The stuck tool detector then generates a signal. The operator or microprocessor based system then carries out certain actions based on the stuck tool detector signal received. If the signal indicates that there is a stuck tool, the operator is alerted to the stuck tool by an alarm, or the machine may be shutdown. Other means or a combination may be used to alert the operator of the stuck tool. If there is no stuck tool, the workpiece moves to the next machining step.

The method and embodiments of the present invention can also detect multiple stuck tools. For example, the moving guide member, or blade, of the second and third embodiments may be configured for different or multiple tools. In addition, multiple moving guide members or trip-wires may be used. A fourth embodiment shows multiple, detector transports and moving guide member configurations. Furthermore, the stuck tool detectors may be positioned to pass the blade or wire through the plane of separation horizontally, vertically, or in some other orientation.

The following drawings and description set forth additional advantages and benefits of the invention. Other advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
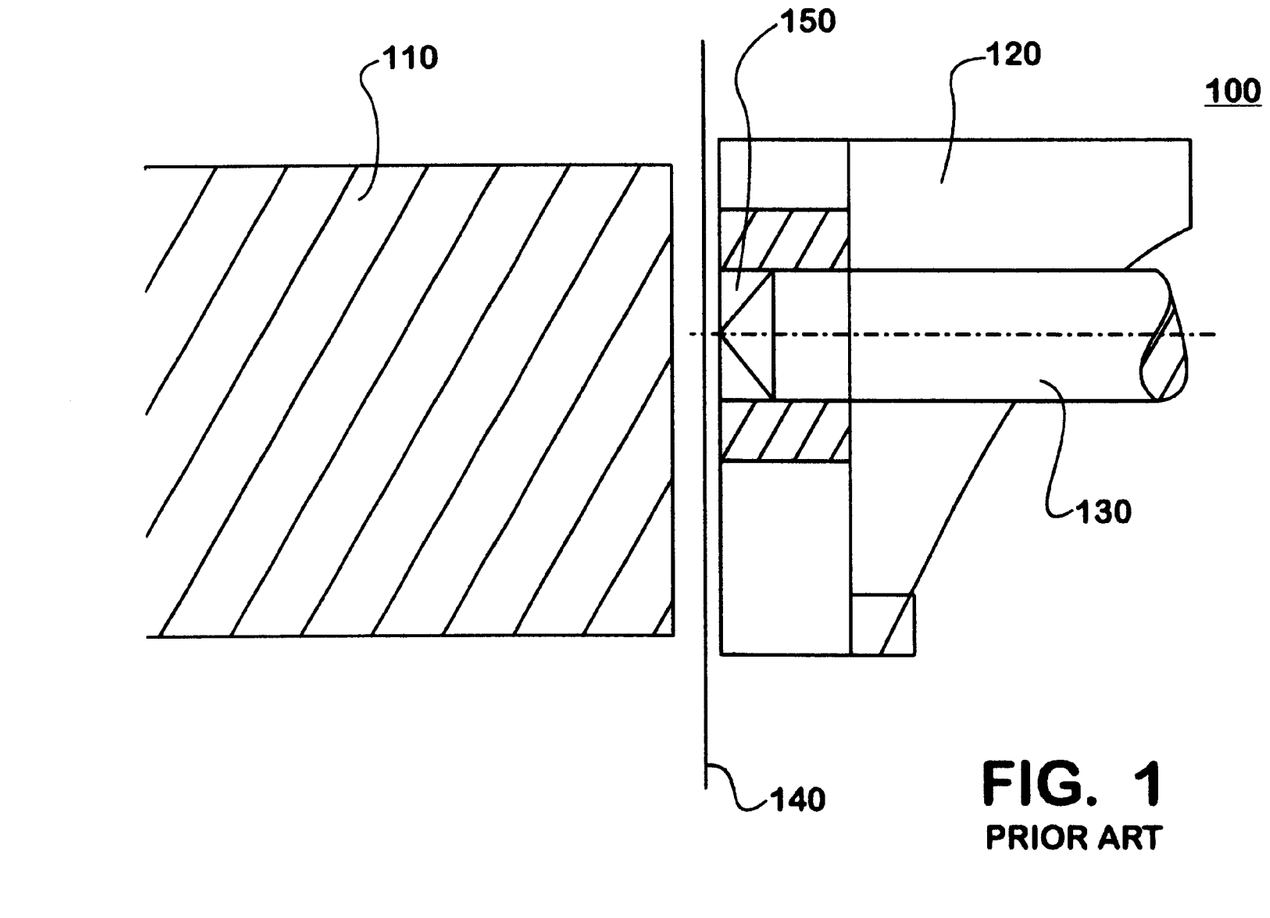
FIG. 1 is a side view of a machine and workpiece according to the prior art.

FIG. 1 shows a drilling machine 100 according to the prior art. Several elements such as a transfer mechanism, a moving pallet or stationary clamping device, and machine base are not shown. The drilling machine 100 has a head 120, which forms a tool cavity 150. A workpiece 110 is positioned adjacent to the machine head 120. A "plane" of separation 140, between the workpiece 110 and the machine head 120 separates the workpiece 110 and head 120. A tool, or reciprocating tool, 130 is positioned inside the cavity 150. The tool 130 is can be positioned either entirely inside the head 120, as shown in FIG. 1, or partially outside the head 120 (not shown). In either case, the plane of separation 140 still separates the workpiece 140 and the machine head 120. Those of skill in the art will also recognize that the plane of separation could instead be a curved surface or other irregular surface that lies between the workpiece 140 and the machine head 120.

In operation, the tool 130 extends from the heading past the plane of separation 140 to engage the workpiece 110. Although tool 130 is shown as a drill, it could be any other type of well known machining tool 130. When the machine 120 finishes drilling the workpiece 110, tool 130 is retracted from the workpiece 110 towards the head 120. If tool 130 becomes stuck in the workpiece 110, the tool 130 bridges the plane of separation 140. Any subsequent movement would most likely destroy the head 120, the workpiece 110, and likely any surrounding equipment.

Figure 2:
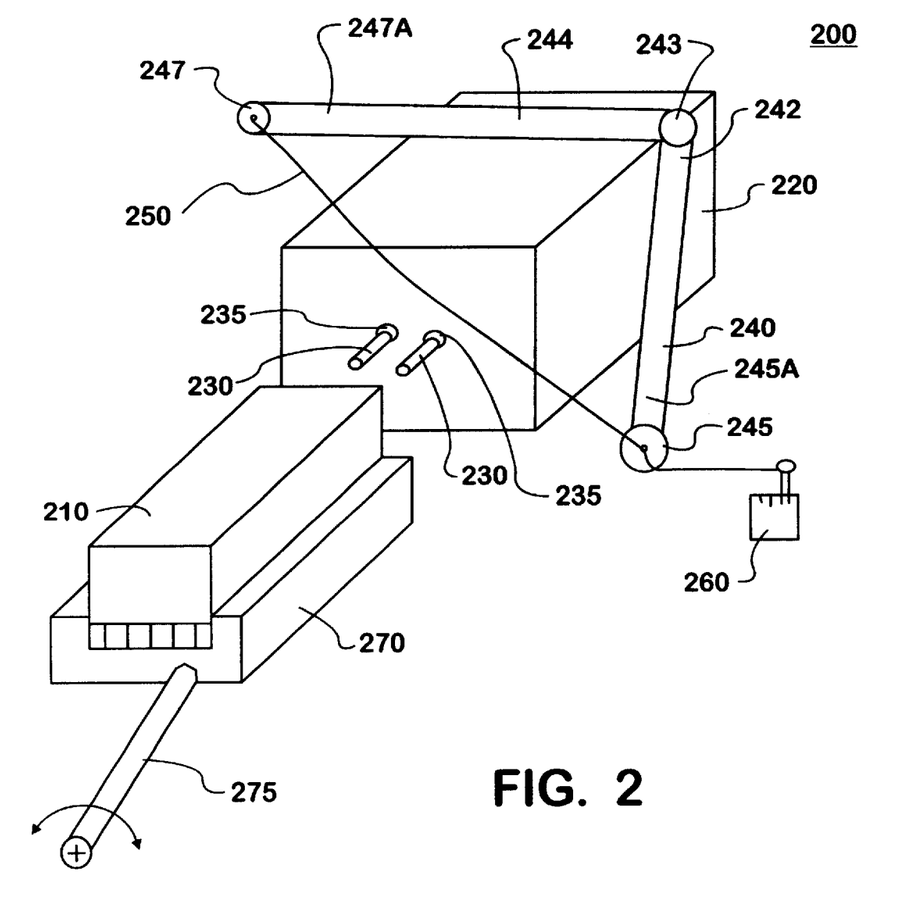
FIG. 2 is a perspective view of a machine with a stuck tool detector according to a first embodiment of the present invention.
Figure 3:
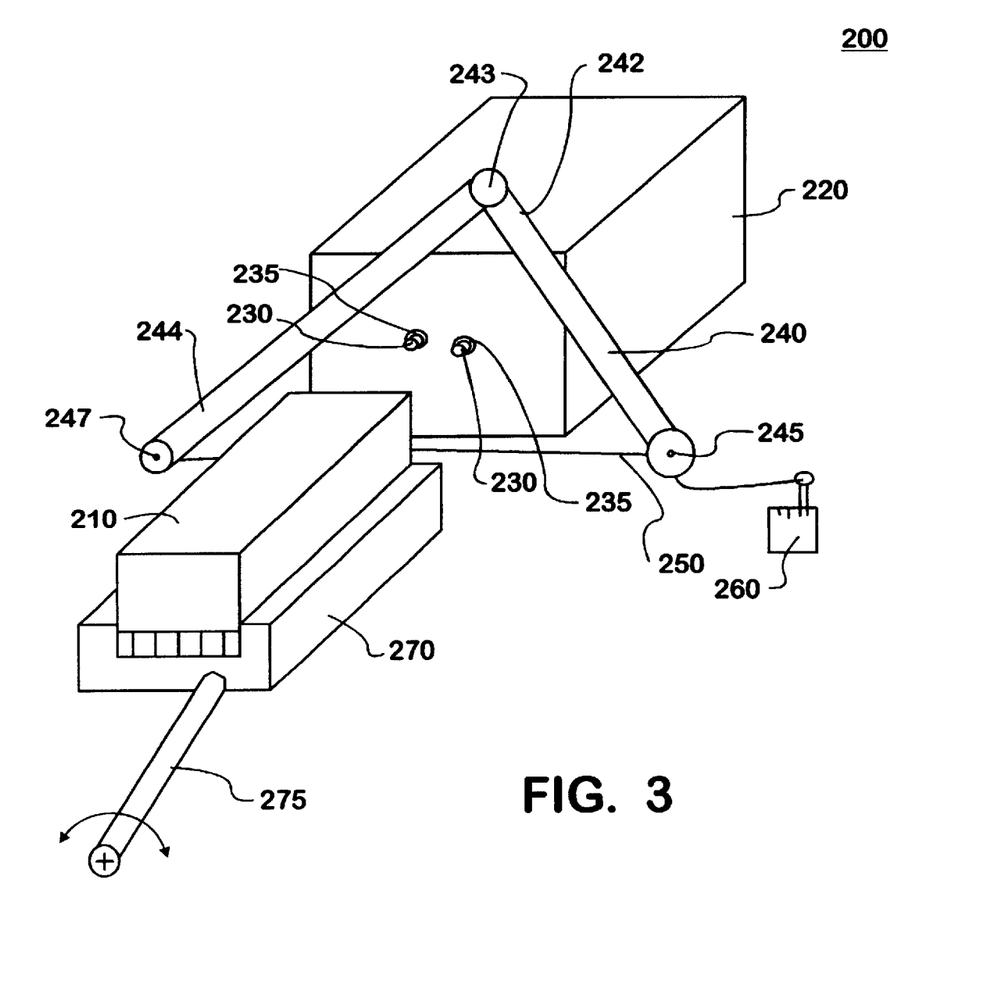
FIG. 3 is a perspective view of the machine in FIG. 2 showing a first embodiment of the stuck tool detector after it has passed the position of the tools.
Figure 4:
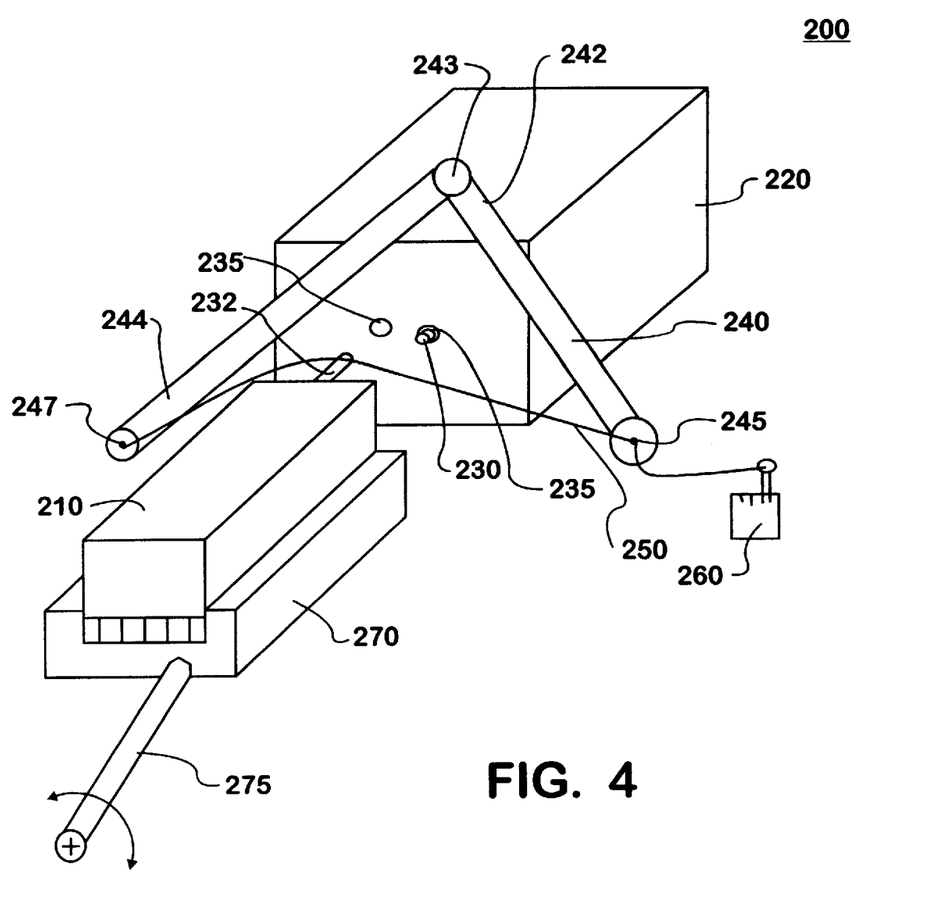
FIG. 4 is a perspective view of the machine in FIG. 2 showing the stuck tool detector engaging a stuck tool.

FIGS. 2–4 show a machine 200 having a stuck tool detector 240 according to a first embodiment of the present invention. The automated machine shown 200 has a head or machine head 220 with multiple tool cavities 235. In these figures, a workpiece 210 is positioned adjacent to the machine head 220. The workpiece 210 is secured in the moving pallet or stationary clamping device 270, which is connected to a transfer mechanism 275. Machine head 220 has tools, or reciprocating tools, 230 which extend from the machine head 220 toward the workpiece 210. The tools 230 then retract from the workpiece 210, after the machining operation is completed, toward the machine tool cavities 235 or head 220.

The stuck tool detector 240 has a detector arm 242 and 244 that has a first end 245A and a second distal end 247A. The detector arm 240 could be viewed as having two arms 242 and 244 forming a substantially triangular shape. Those of skill in the art will recognize that the detector arm 240 could take on other shapes, for example a substantially semi-circular shape. There is also a trip-wire or trip-wire member 250 that is attached between the first end 245A and second distal end 247A of the detector arms. The trip-wire 250 is further attached to a stuck tool sensor 260. In a preferred embodiment, the stuck tool sensor is a limit switch that is actuated when the trip-wire 250 encounters a stuck tool. The stuck tool detector 240 rotates about a rotating pivot pin 245 to move the trip-wire 250 along a plane of separation (shown in FIG. 1) between the workpiece 210 and the machine 220. In this embodiment, the rotating pivot pin 245 is mounted to the machine 200 and controlled by the microprocessor based system that also controls the machine 200. FIG. 2 shows the stuck tool detector 240 in its non-operating position. When operated, the stuck tool detector 240 rotates about the rotating pivot pin 245. This passes the trip-wire 250 through the plane of separation 140 between the workpiece 210 and the machine head 220. If no tools 230 are stuck in the workpiece 210, the trip-wire 250 passes unopposed to the position as shown in FIG. 3. If one or both of the tools 232 are stuck in the workpiece 210, the trip-wire 250 encounters or catches the stuck tool 232 as shown in FIG. 4. In this case, the trip-wire 250 actuates the stuck tool sensor 260 thus indicating a tool is stuck in workpiece 210. In a preferred embodiment, the trip-wire 250 pulls on a limit sensor 260 to indicate a stuck tool 230.

Actuation of the stuck tool sensor 260 results in an alarm signal. The alarm signal can alert an operator of the presence of a stuck tool 230. Alternatively, the stuck tool signal can be sensed directly by the microprocessor based system which will take the appropriate action to prevent the automated machining operation from proceeding to the next machining operation until the stuck tool 230 condition is rectified.

Figure 5:
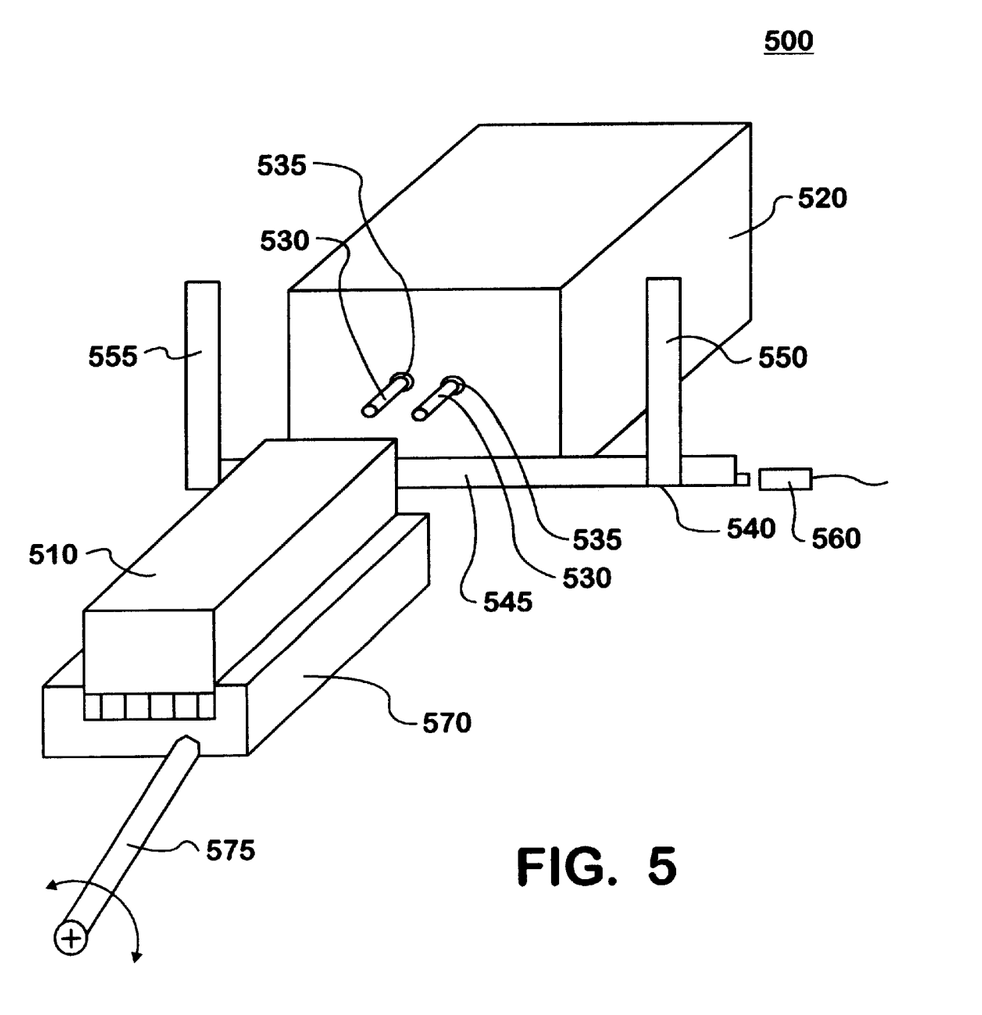
FIG. 5 is a perspective view of a machine with a stuck tool detector according to a second embodiment of the present invention.

FIG. 5 shows a machine 500 having a stuck tool detector 540 according to a second embodiment of the present invention. The machine 500 has a head 520 which forms one or more tool cavities 535. A workpiece 510 is positioned adjacent to the head 520. As with the previous embodiment, the machine head 520 has reciprocating tools 530 that extend from the machine head 520 toward the workpiece 210. The tools 530 will retract from the workpiece 510 toward the machine tool cavities 535 or head 520 after the machining operation is complete.

The stuck tool detector 540 has a first guide 550 and a second guide 555. In this embodiment, the first and second guides 550, 555 are blade guides that are substantially vertically positioned for sliding a blade, or other moveable guide member, 545 vertically along the plane of separation between the workpiece 510 and machine head 520. Those of skill in the art will readily recognize that the first and second blade guides 550, 555 may also be substantially horizontally positioned such that the sliding blade 545 would move or travel horizontally. The first and second blade guides 550 and 555 can also be position in other orientations with respect to the vertical and horizontal. A stuck tool sensor 560 such as a proximity sensor or similar device determines the location of the moveable blade member 545. Only one stuck tool sensor or proximity sensor 560 is shown in FIG. 5; however it will be readily apparent that more than one proximity sensor or stuck tool detector 560 may be positioned along the first blade guide 550. Also, stuck tool detectors or proximity sensors 560 may also be positioned along the second blade guide 555.

The moveable guide member or blade 545 may be made of any suitable material including metal, plastic, composite materials, or an engineered elastomer such as KEVLAR. While many materials may work, some will perform better for longer periods of time. The material should preferably have must have an appropriate balance of rigidity and resilience. The material should be rigid enough for its position to be ascertained accurately by the sensors. The material should preferably be resilient enough not to break or deform drastically when it hits a stuck tool. In addition, the moveable guide member blade 545 may be in the form of a slat, wire, cord, or other suitable shape.

If no machine tools 530 are stuck in the workpiece 510, the moveable guide member blade 545 passes by the machine tool cavities 535 unopposed. The moveable guide member 545 travels along the plane of separation between the workpiece 510 and the machine head 520. If one of the machine tools 530 is stuck in the workpiece 510, the moveable guide member 545 stops against the stuck tool 530. The stuck tool sensor or proximity sensor 560 determines the blade 545 has stopped and generates an signal, i.e., an alarm signal, that indicates that a tool 530 is stuck in workpiece 510.

If the stuck tool sensor 560 generates an alarm signal, the operator will be alerted to the presence of a stuck tool 530. Attentively, the alarm signal will be sensed directly by the microprocessor based system which will take the appropriate action to prevent the automated machining operation from proceeding to the next machining operation until the stuck tool 530 condition is rectified.

Figure 6:
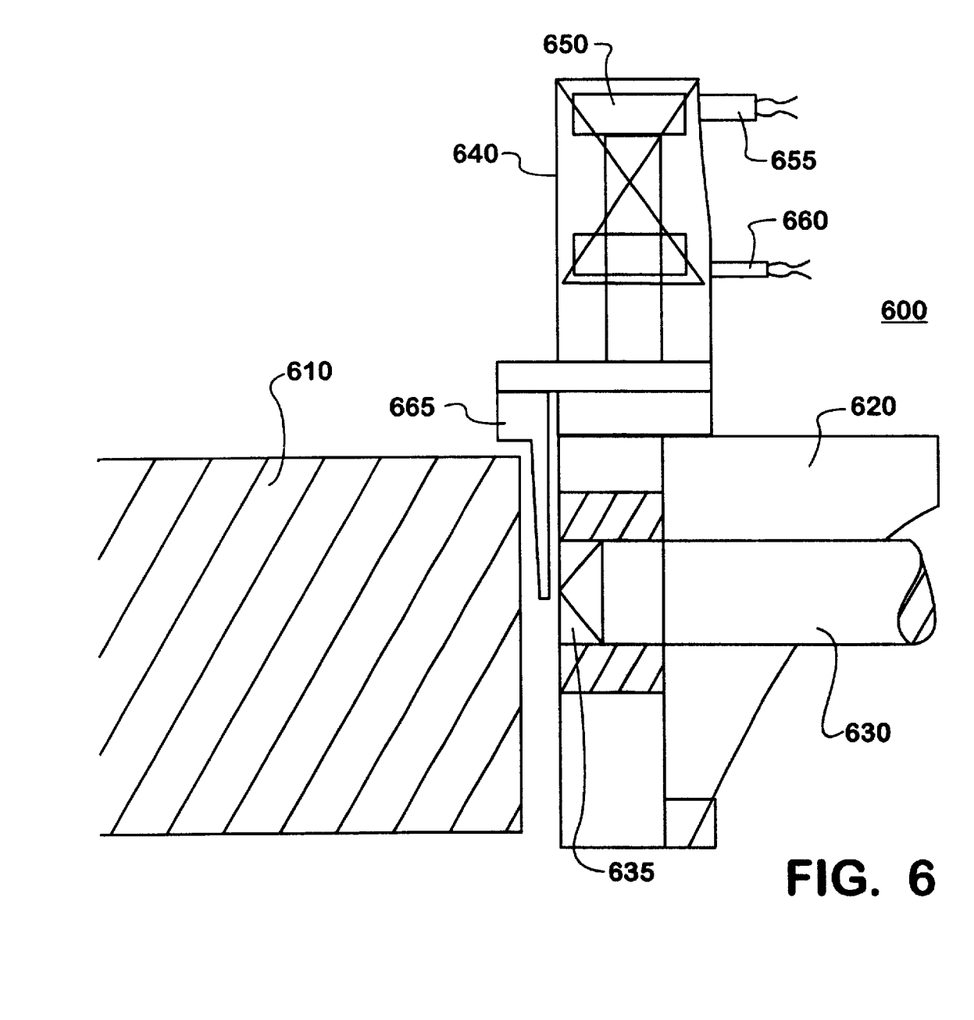
FIG. 6 is a perspective view of a machine with a stuck tool detector according to a third embodiment of the present invention.

FIG. 6 shows a partial cross-sectional view of an automated machine 600 having a stuck tool detector 640 according to a third embodiment of the present invention. The automated machine 600 has a machine head 620 with a machine tool cavity 635. A workpiece 610 is positioned adjacent to the head 620. A reciprocating tool 630 is positioned to travel in the machine head 620 cavity 635. As before, the reciprocating tool 530 extends into and out of the workpiece from the machine head 520.

The stuck tool detector of this embodiment has a detector transport 650 connected to a moveable guide member or blade 665. The detector transport 650 moves the moveable guide member blade 665 vertically along a plane of separation between the workpiece 610 and the machine head 620. The detector transport 650 is operatively connected to an up-sensor 655 and a down-sensor 660. The up-sensor 655 and a down-sensor 660, determine the position of the detector transport 640 and thereby the position of the moveable guide member 665. Those of skill in the art will recognize that one or more sensors 655 and 660 may be used to determine the position of the moveable guide member 665 along the plane of separation. When the detector transport 640 is in a down-position, the moveable guide member 665 can, depending on the particular application, can partially or fully cover the tool cavity 635 for the reciprocating tool 630.

For example, a partial cover is desired to permit hydraulic fluid, water, or air to escape from cavity 635. If the reciprocating tool 630 is stuck in the workpiece 610, the moveable guide member blade 665 will not be able to reach the down-position.

The detector transport 640 may be any suitable device or component that can move the moveable guide member 665 along the plane of separation between the workpiece 610 and the machine head 620. For example, the detector transport 640 may be comprised of components that are pneumatic, electrical, magnetic, mechanical or hydraulic. The moveable guide member 665 may be made of any suitable material including metal, plastic, a composite material, or an engineered elastomer such as KEVLAR. While many materials may work, some will perform better for longer periods of time. The material should have an appropriate balance of rigidity and resilience. The material should be rigid enough for its position to be ascertained by the sensors. It should be resilient enough not to break or deform drastically when it hits a stuck tool. In addition, the blade may take other suitable shapes.

In operation, the detector transport 640 is normally in an up-position while a machining operation is performed on the workpiece. In the up-position, the moveable guide member or blade 665 is clear of interfering with the reciprocating tool 630. Once the machining operation is completed, the detector transport 640 begins to move the blade 665 along the plane of separation toward a down-position. The up-sensor 655 senses when the detector transport 650 has left the up-position.

If reciprocating tool 630 is not stuck in workpiece 610, the detector transport 640 reaches a down-position where the moveable guide member 665 partially or fully covers the tool cavity 635. The down-sensor 660 will sense when the detector transport 650 has reached and is in a down-position. The detector transport 640 then returns to the up-position. The workpiece 610 then moves to the next machining operation.

If the reciprocating tool 630 is stuck in the workpiece 610, the moveable guide member 665 will not permit the detector transport 650 to reach the down-position. If the detector transport 650 does not reach the down-position within a predetermined time period, a signal or alarm signal is generated. The predetermined time period starts when the up sensor 655 senses the detector transport 640 is no longer in the up position. The predetermined time period may include a buffer period to reduce the number of "false" determinations. If there is an alarm signal, the operator will be alerted to the presence of a stuck tool 630. The alarm signal may also or alternatively be sensed by the microprocessor based system which will prevent the automated machining operation from proceeding to the next machining operation until the stuck tool condition is rectified.

Figure 7:
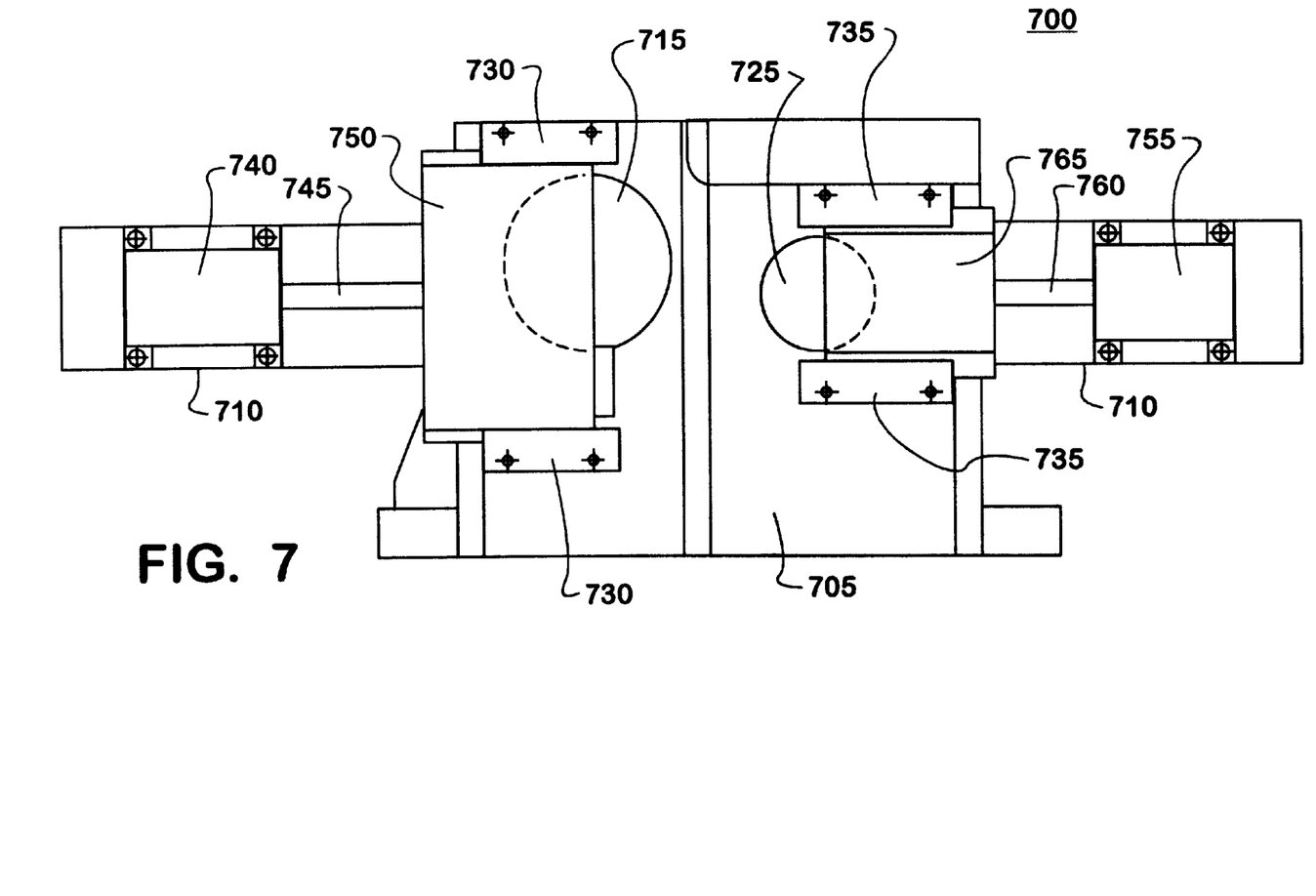
FIG. 7 is a front view of a machine with a stuck tool detector according to a fourth embodiment of the present invention.

FIG. 7 shows the front view of an automated machine 700 having a stuck tool detector 710 according to a fourth embodiment of the present invention. The machine 700 has a machine head 705 with a first tool cavity 715 and a second tool cavity 725. Reciprocating tools (not shown) are positioned inside tool cavities 715, 725. No workpiece is shown in FIG. 7, but it is understood that as in FIGS. 1–6, the workpiece is in front of the machine head 705 and that the reciprocating tools extend from the machine head 520 toward the workpiece 210. The reciprocating tools will retract from the workpiece toward the machine tool cavities 715 and 725 after the machining operation is complete.

The stuck tool detector 710 has a first detector transport 740, which engages a first connecting member or rod 745 to move a first moveable guide member 750 in a first guide or guide pair 730. The first detector transport 740 moves the corresponding first moveable guide member 750 along a first plane of separation between the first tool cavity 715 and the workpiece. The first detector transport 740 is operatively connected to corresponding position-sensors (not shown), which determine the position of the first moveable guide member 750. When fully extended in a first closed-position, the first moveable guide member blade 750 can, depending on the particular application, partially or fully cover the first tool cavity 715. For example, a partial cover may be desired to permit hydraulic fluid, water, or air to escape from the first tool cavity 715. Fully covering the first tool cavity 715 may be desired in other applications. If the reciprocating tool is stuck in the workpiece, the moveable guide member blade 750 will not be able to reach the first closed-position. When fully retracted by the first detector transport 740, the first moveable guide member 750 completely uncovers first tool cavity 715.

In this fourth embodiment, the stuck tool detector 710 has a second detector transport 755, which engages second connecting member or rod 760 to move a second moveable guide member or blade 765. The second detector transport 755 moves the corresponding second guide or guides pair 735 along a corresponding plane of separation between the second tool cavity 725 and the workpiece. The second detector transport 755 is operatively connected to corresponding second position-sensors (not shown), which determine the position of the second moveable guide member blade 765. When fully extended, in a second closed-position, the second moveable guide member blade 765 can, depending on the particular application, partially or fully cover the corresponding second tool cavity 725. For example, a partial cover is desired to permit hydraulic fluid, water, or air to escape from the second tool cavity 725. Fully covering the second tool cavity 725 may be desired in some applications. If the reciprocating tool is stuck in the workpiece, the second moveable guide member 765 will not be able to reach the second closed-position. When fully retracted by the second detector transport 755, the second moveable guide member 765 completely uncovers the second tool cavity 725.

The detector transports 740 and 755 may be any suitable device or component that can move the moveable guide members 750 and 765 along the plane of separation between the workpiece and the machine head 705. For example, the detector transports 740 and 755 may be comprised of components that are pneumatic, electrical, magnetic, mechanical or hydraulic. The blades 750 and 765 may be made of any suitable material including metal, plastic, composite materials, or an engineered elastomer such as KEVLAR. While many materials may work, some will perform better for longer periods of time. The material should have an appropriate balance of rigidity and resilience. The material should be rigid enough for its position to be ascertained accurately by the sensors. It also should be resilient enough not to break or deform drastically when it hits a stuck tool. In addition, the blades 750, 765 may take other suitable shapes.

When a machining operation is performed, detector transports 740 and 755 open their respective blades 750 and 755 so the tool cavities 715, 725 are completely uncovered and the moveable guide member blades 750 and 765 do not interfere with the reciprocating tools. Once the machining operation is completed, the detector transports 740, 755 close the moveable guide members 750 and 765 to cover the respective tool cavities 715 and 725. If no reciprocating tools are stuck in the workpiece, the moveable guide member blades 750 and 765 will reach their respective first and second closed-positions. The first and second position sensors will sense the closed position of the blades 715 and 725. The moveable guide member blades 715 and 725 will move away from the tool cavities 715 and 725 along the respective first and second planes of separation and the workpiece will move into position for the next machining operation.

As before, If one or more of the machine tools are stuck in the workpiece, the corresponding first or second moveable guide member 750 and 765 will stop against the stuck tool. The first or second position-sensors will determine that the moveable guide members 750 and 765 have not reached a first and/or second closed-position. One or more position-sensors will then generate a signal or alarm signal that indicates that a tool is stuck in the workpiece. If the position-sensors generate an alarm signal, the operator will be alerted to the presence of a stuck tool. Alternatively, the alarm signal will be sensed directly by the microprocessor based system which will prevent the automated machining operation from proceeding to the next machining operation until the stuck tool condition is rectified. Other means may be used to alert the operator, such as completely shutting down the automated machine.

Figure 8:
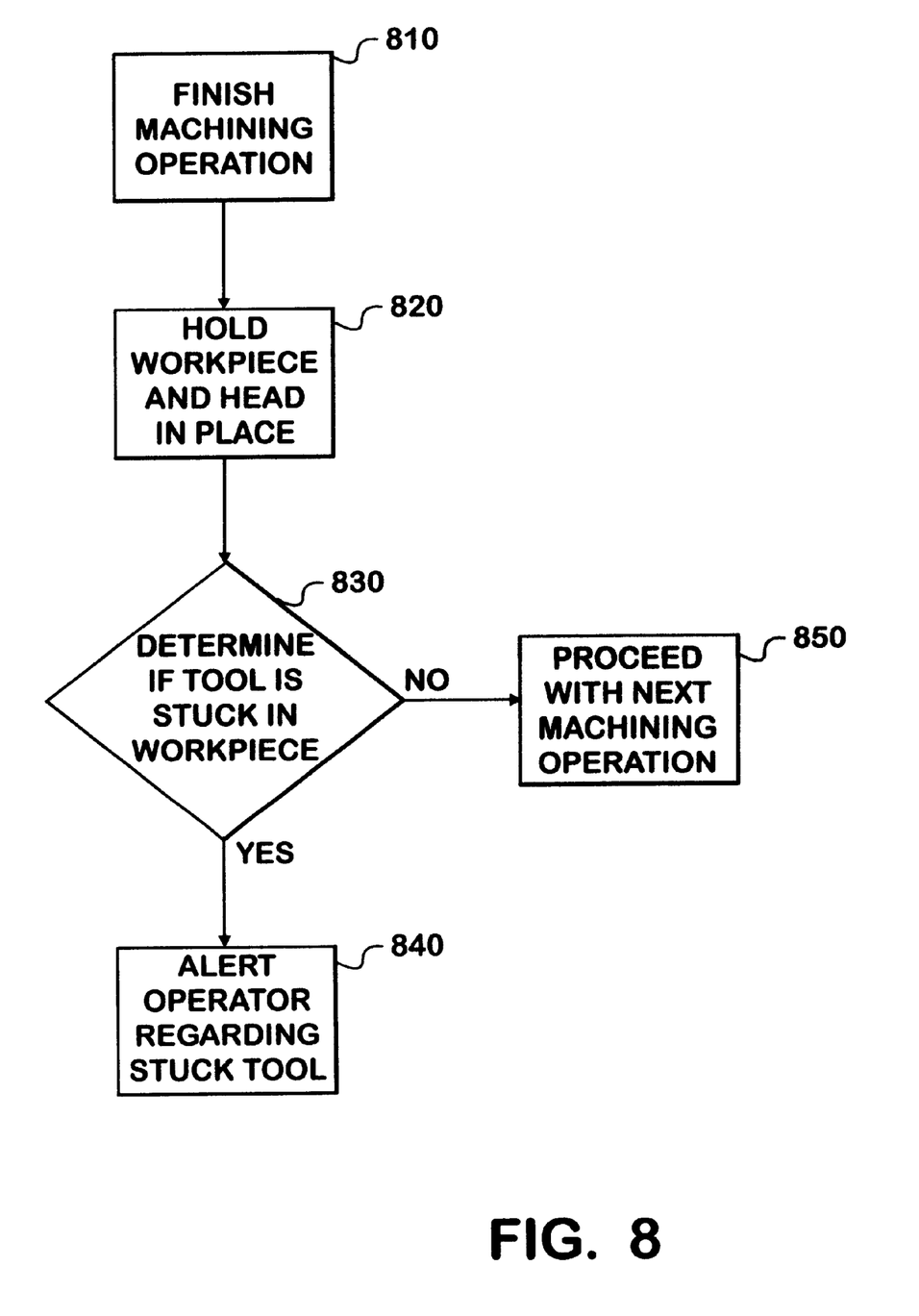
FIG. 8 is a flowchart of a method for detecting a stuck tool according to the present invention.

FIG. 8 shows a flowchart for a method to detect a stuck tool in an automated machining process according to the present invention. In step 810, a machining operation on a workpiece is completed. At this point, the tool (e.g., 230, 530, 630) has retracted or is supposed to have retracted completely from the workpiece and towards the tool cavity (e.g., 235, 535,635) in the head (e.g., 220, 520, 620).

In step 820, the workpiece (e.g., 210, 510, 610) and head (e.g., 220, 520, 620) are held in place.

In step 830, a stuck tool detector is operated to determine whether a reciprocating tool is stuck in the workpiece. This determination may be made using any of the embodiments described in FIGS. 2–7. Other means to physically determine whether a stuck tool is present may be used, e.g., laser, fluid (water, air, etc.), and acoustic methods may be used to determine whether there is a stuck tool. However, they are not very reliable given the machine environment. Metal chips and other debris may block or deflect the laser or fluid. Acoustic signals may be misread or misinterpreted.

In step 840, the operator or the microprocessor based system receives an alarm signal from the stuck tool detector indicating that a stuck tool is sensed. The alert may be an alarm such as a flashing light or horn. The alarm signal may also be a signal to stop the machine, or the alarm signal may actually stop the machine. Further, the alarm signal may instead stop the machine and the surrounding equipment. Those of skill in the art will recognize that there may be other types or a combination of alerts send to the to the operator or microprocessor based system. For example, in many automated machining processes, it is desirable for the alert to notify the operator and to prevent the workpiece from proceeding to the next machining operation until the stuck tool condition is addressed and rectified. In step 850, the automated machining process continues to the next or subsequent machining operation since no stuck tool was detected.

The method and embodiments of the present invention may detect multiple tools having various configurations on the machine head. For example, the moveable guide members or blades 545, 630 may be cut or otherwise configured for multiple tools 530, 630 on the machine head 520, 620. In addition, multiple moveable guide members or blades (not shown) may be used. For example, the fourth embodiment of FIG. 7 illustrated an automated machine and workpiece with multiple stuck tool detectors (two detectors shown in this embodiment) that can each sense a stuck tool in an automated machine with multiple reciprocating tools. While the embodiments of FIGS. 2–6 illustrated automated machines and workpieces that have a singular stuck tool detector that can senses stuck tools in automated machines with multiple reciprocating tools or with one reciprocating tool (not shown). Also, those of skill in the art will readily recognize that the multiple tool cavities corresponding to a reciprocating tool may all lie in the same plane or may each lie in different planes between the tool cavity and workpiece.

Additionally, it will readily apparent to those skilled in the art, that the stuck tool detector could instead use a non-mechanical sensing mechanism to encounter and detect a stuck tool, e.g., electromagnetic (EM) waves, a light beam or a laser sensor beam. The non-mechanical sensing mechanism could be used instead of the trip-wire, blade, or moveable guide member. In this case, the presence of a stuck tool would interfere or interact with the EM waves, light beam or laser sensor beam and result in an alarm signal, indicating the presence of a stuck tool.

The present invention has been described and illustrated by way of certain examples of preferred embodiments relating to automated machining processes only. However, the invention may be used on other processes that involve the machining of workpieces other than engine parts. Additional advantages will be readily apparent to those skilled in the art, who may modify the embodiments without departing from the true spirit and scope of the invention. Therefore, this invention is not limited to the specific details, representative devices, and illustrated examples in this description. The present invention is limited only by the following claims and equivalents.

We claim:

1. A stuck tool detector for use in detecting a tool in a workpiece in an automated machining process having an automated machining tool with reciprocating tools for work on the workpiece, the stuck tool detector comprising:

(a) at least one stuck tool sensing member able to selectively travel in sufficiently close proximity to a surface of the workpiece to sense a tool extending from said workpiece; and (b) at least one stuck tool sensor cooperatively connected to a corresponding stuck tool sensing member;

(c) the stuck stool sensing member actuating a corresponding stuck tool sensor when a stuck tool in said workpiece is encountered resulting in an alarm signal.

2. The stuck tool detector of claim 1, wherein the stuck tool sensing member travels in a plane of separation between the workpiece and the automated machine.

3. The stuck tool detector of claim 2, wherein the stuck stool sensing member travel is controlled by the automated machining tool.

4. The stuck tool detector of claim 3, wherein the automated machining tool uses a microprocessor-based controller to control the travel of the stuck tool sensing member.

5. The stuck tool detector of claim 3, wherein the stuck tool sensing member is a trip-wire, a blade, a moveable guide member, an electromagnetic wave, a light beam, or a laser beam.

6. The stuck tool detector of claim 5, wherein the trip-wire is a slat, a wire, or a cord.

7. The stuck tool detector of claim 5, wherein the moveable guide-member is metal, plastic, a composite material, or an engineered elastomer.

8. The stuck tool detector of claim 5, wherein the stuck tool sensor is a limit switch, a proximity sensor or a position sensor.

9. The stuck tool detector of claim 2, wherein the travel of the stuck stool sensing member is vertical, horizontal, radial or angled.

10. A stuck tool detector for use in an automated machining operation, the stuck tool detector comprising:
   (a) a detector arm having a first end and a second distal end;
   (b) a rotating pivot pin mounted to and controlled by an automated machine, the first end connected to the pivot pin allowing rotation of the detector arm;
   (c) a stuck tool sensor; and
   (d) a trip-wire cooperatively attached between the second distal point and the pivot pin, the trip-wire further connected to the stuck tool sensor;
      whereby a stuck tool can be detected by rotation of the trip-wire through a plane of separation between a workpiece and the automated machine such that the trip-wire will actuate the stuck tool sensor when a stuck tool is present resulting in an alarm signal.

11. The stuck tool detector of claim 10, wherein the trip-wire is a slat, a wire, or a cord.

12. The stuck tool detector of claim 10, wherein the detector arm is comprised of a first and second arm.

13. The stuck tool detector of claim 10, wherein the detector arm and the trip-wire substantially form a triangle or semicircle.

14. The stuck tool detector of claim 10, wherein the stuck tool detector is a limit sensor.

15. A stuck tool detector for use in an automated machining operation, the stuck tool detector comprising:
   (a) a first guide;
   (b) a second guide;
   (c) a movable guide member cooperatively mounted between the first and second guides, whereby the moveable guide member can move along a plane of separation between an automated machine and a work piece; and
   (d) a stuck tool sensor for determining that the moveable guide member has ceased movement due to a stuck tool;
      whereby the guide member will actuate the stuck tool sensor when a stuck tool is present resulting in an alarm signal.

16. The stuck tool detector of claim 15, wherein the first and second guides have a vertical orientation such that the moveable guide member has a substantially horizontal orientation and cooperatively travels in a vertical manner.

17. The stuck tool detector of claim 15, wherein the first and second guides have a horizontal orientation such that the moveable guide member has a substantially vertical orientation and cooperatively travels in a horizontal manner.

18. The stuck tool detector of claim 15, wherein the moveable guide-member is a metal, plastic, composite material, or an engineered elastomer.

19. The stuck tool detector of claim 15, wherein the stuck tool sensor is a proximity sensor.

20. A stuck tool detector for use in an automated machining operation, the stuck tool detector comprising:
   (a) a detector transport;
   (b) an up-sensor that senses when the detector transport is no longer in an up-position;
   (c) a down-sensor that senses when the detector transport has reached a down-position; and
   (d) a movable guide member cooperatively connected to the detector transport, whereby the detector transport moves the moveable guide along a plane of separation between an automated machine head and a work piece;
      whereby the down-sensor generates an alarm signal when the detector transport fails to reach the down-position within a predetermined time after leaving the up-position.

21. The stuck tool detector of claim 20, further comprising a tool cavity on the automated machine whereby the tool cavity is partially covered by the detector guide member when the detector transport is in the down-position.

22. The stuck tool detector of claim 20, wherein detector transport components are pneumatic, electrical, mechanical or hydraulic.

23. A stuck tool detector for use in an automated machining operation, the stuck tool detector comprising:
   (a) at least one detector sport;
   (b) at least one position-sensor that senses when the corresponding detector transport has reached a closed-position;
   (c) at least one guide;
   (d) at least one moveable guide member cooperatively connected to a corresponding detector transport, whereby the corresponding detector transport moves the moveable guide member along a plane of separation between a corresponding tool cavity and a workpiece; and
   (e) whereby the position-sensor generates an alarm signal when the corresponding guide member does not reach the closed-position.

24. The stuck tool detector of claim 23, wherein the corresponding tool cavity is partially covered by the moveable guide member in the closed-position.

25. The stuck tool detector of claim 23, wherein the moveable guide members lie in the same plane.

26. The stuck tool detector of claim 23, wherein the moveable guide members lie in different planes.

27. The stuck tool detector of claim 23, wherein detector transport components are pneumatic, electrical, mechanical or hydraulic.

28. In an automated machining process having an automated machine with reciprocating tools for work on a workpiece, a method of detecting a stuck tool comprising the steps of:
   (a) finishing an automated machining operation on the workpiece;
   (b) retracting the tool from the workpiece;
   (c) holding the workpiece and head in place;
   (d) operating a stuck tool detector;
   (e) receiving a detector signal from the stuck tool detector indicating whether a stuck tool is present;
   (f) executing a subsequent automated machining action based on the detector signal received.

29. The method of detecting a stuck tool of claim 28, wherein the detector signal is received by a microprocessor based system whereby the system determines a subsequent action for the automated machining process.

30. The method of detecting a stuck tool of claim 28, wherein the stuck tool detector comprises:
   (a) a detector arm that rotates about a pivot pin; and
   (b) a trip-wire that traverses through a plane of separation between the workpiece and the automated machine;
      whereby the trip-wire actuates a stuck tool sensor when a stuck tool is present between the workpiece and the automated machine.

31. The method of detecting a stuck tool of claim 28, wherein the stuck tool detector comprises:
   (a) a movable guide member, cooperatively mounted between a first and second guide, that moves along a plane of separation between the machine and the workpiece;
      whereby the moveable guide member actuates a stuck tool sensor when a stuck tool is present between the automated machine and the workpiece.

32. The method of detecting a stuck tool of claim 28, wherein the stuck tool detector comprises:
   (a) a detector transport;
   (b) an up-sensor that senses when the detector transport is in an up-position;
   (c) a down-sensor that senses when the detector transport has reached a down-position; and
   (d) a movable guide member cooperatively connected to the detector transport, whereby the detector transport moves the moveable guide along a plane of separation between the automated machine and the workpiece;
      whereby the down-sensor generates an detector signal when the detector transport fails to reach the down position within a predetermined time after leaving the up-position.

33. The method of detecting a stuck tool of claim 28, wherein the stuck tool detector comprises:
   (a) at least one detector transport;
   (b) at least one moveable guide member that covers a corresponding tool cavity in a closed position;
   (c) at least one guide;
   (d) at least one closed-sensor that senses when the corresponding detector transport has reached a closed-position;
   (e) at least one connector cooperatively connecting the at least one guide member to the corresponding at least one detector transport for guide member movement via the corresponding at least one guide to a closed-position; and
      whereby the closed-sensor generates an alarm signal when the corresponding guide member does not reach the closed-position.

* * * * *